(12) United States Patent
Forloni

(10) Patent No.: US 6,299,984 B1
(45) Date of Patent: Oct. 9, 2001

(54) HEAT-SHRINKABLE MULTILAYER THERMOPLASTIC FILM

(75) Inventor: Roberto Forloni, Milan (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/390,970

(22) Filed: Sep. 7, 1999

(51) Int. Cl.⁷ .................................................... B32B 27/08
(52) U.S. Cl. .................................. 428/474.4; 428/425.8; 428/476.3; 264/173.16; 264/173.15; 264/173.19
(58) Field of Search .............................. 428/474.4, 475.8, 428/476.3; 264/173.16, 173.15, 173.19

(56) References Cited

FOREIGN PATENT DOCUMENTS

| 0 214 314 | * | 3/1987 | (EP) . |
|---|---|---|---|
| 0 214 314 | * | 3/1987 | (EP) . |
| 0 318 964 | | 6/1989 | (EP) . |
| 0380123 | * | 1/1990 | (EP) . |
| 0 380 123 | | 8/1990 | (EP) . |
| 0 620 244 | | 10/1994 | (EP) . |

* cited by examiner

*Primary Examiner*—Leszek Kiliman
(74) *Attorney, Agent, or Firm*—Mark B. Quatt

(57) ABSTRACT

A highly oriented, heat-shrinkable, multi-layer film comprising a layer a) comprising a polyamide and an outer heat-sealing layer b) comprising a polyolefin, which film has been oriented at a stretching ratio ≧ about 3.0:1 in the machine direction and at a stretching ratio ≧ about 6.0:1 in the transverse direction, characterized in that the polyamide of layer a) is a crystalline or partially crystalline co-polyamide with a $T_g \leq 100°$ C.

18 Claims, No Drawings

HEAT-SHRINKABLE MULTILAYER THERMOPLASTIC FILM

The present invention refers to an improved, highly oriented and heat-shrinkable, multilayer thermoplastic film comprising a layer comprising a polyamide and an outer heat-sealing layer comprising a polyolefin, to a process for the manufacture thereof and to its use as a packaging material.

Orientation is a process whereby a plastic film or sheet is stretched in such a way to orient the polymeric chains of the plastic material in the direction of the force applied.

Orientation brings out the maximum strength and stiffness inherent in the polymer system, thus increasing the tensile properties of the film.

Orientation also induces higher level of crystallinity so that properties like barrier properties are further enhanced in an oriented film.

In general orientation leads to a crystalline structure that scatters much less light than the crystalline domains formed in unoriented films and therefore orientation leads to generally superior optical properties.

Also, another very important contribution given by orientation to the end film properties resides in the introduction of a shrink feature. In fact, if the film obtained by orientation, where the polymer molecules are aligned in the direction of the drawing force and locked into this configuration by cooling, is heated to a temperature close to the orientation one, mobility is restored in the polymer molecules and they relax back to the coil configuration, physically manifesting said relaxation with a shrink along the direction of the orientation.

Oriented, heat-shrinkable films are therefore widely appreciated and widely used in packaging, particularly in food packaging. In general terms the packaging of food and non-food items by means of an oriented, heat-shrinkable, thermoplastic film comprises configuring the heat-shrinkable packaging material, either partially or completely, around a product, removing excess air if necessary, sealing it to itself or to the rims of a support containing the product to be packaged or otherwise let the two edges of the packaging material to overlap and adhere to each other without heat-sealing them and thereafter exposing the package to a heat source thereby causing the heat-shrinkable film to shrink and conform with the contours of the packaged item or become tight between the rims to which it has been sealed.

Heat-shrinkable films are used to both provide the package with an aesthetically appealing appearance and guarantee that the packaged product is protected from the environment.

Polyamides are very widely employed in the manufacture of heat-shrinkable films. They can be employed i.a. as core layers of multi-layer films having a heat-sealable polyolefin layer, because of their gas-barrier properties. It is in fact possible to modulate the gas permeability of the end films by suitably selecting the type of polyamide of the core layer.

In general, oriented, heat-shrinkable films comprising a polyamide layer and an outer heat-sealing polyolefin layer, are obtained by a tubular orientation process. In said process a thick multi-layer tube is first extruded through a round die, quenched as rapidly as possible to prevent or slow down crystallization, reheated, e.g. by passing it into a hot water bath or an IR oven, and then stretched in the transverse direction (TD) by introducing into the tube an air pressure that expands the tube diameter to a sort of a bubble and in the machine direction (MD) by running the two sets of nip rolls that contain said bubble at a different speed.

By this method stretching in the two perpendicular directions, MD and TD, occurs simultaneously. It is thus possible to carry out the orientation step at a fairly low temperature, compatible with the presence of an outer polyolefin layer and with the requirement for a low temperature shrink for the end film.

The orientation ratios that can be applied with the tubular orientation processes are however limited and ratios up to about 3.5:1 are typically applied.

Higher stretching ratios could, in line of principle, be employed using flat extrusion and flat stretching. Flat stretching is generally done sequentially, i.e. the film is first stretched in the MD and then in the TD. The MD stretching is accomplished by drawing the heated sheet between sets of heated rolls with the downstream set moving at a higher speed. The TD stretching is on the other hand obtained by means of a tenter frame, a machine that consists of two continuous chains on which are mounted clamps gripping the two edges of the film and carrying it along as the chain is driven forward. The two chains gradually move part and as they do they draw the film in the TD between them.

Conventional stretching ratios for the flat, tenter frame orientation process are up to about 7:1 in MD and up to about 12:1 in TD.

Particularly in case of crystalline or partially crystalline polymers, sequential stretching may however present some problems as the first stretching step induces some polymer crystallization that increases the resistance of the film to further stretching, thus limiting the applicable stretching ratios or requiring more drastic conditions.

In the patent literature there are described heat-shrinkable films comprising a polyamide layer and a polyolefin outer layer obtained by tenter frame stretching, that however have been stretched to a limited stretching ratio (<2.2:1 in MD and >4:1 in TD in Japanese kokai 79/15981 (Derwent AN 79-20793B) or 3:1 in MD and 4:1 in TD in Japanese kokai 92/52137 (Derwent AN 92-117943)).

The use of high stretching temperatures, particularly for the transverse stretching, would help to increase the stretching ratios but these high temperatures would not be compatible with the presence of the polyolefin resin of the outer layer. Furthermore they would impair the shrink and mechanical properties of the end film as the higher the stretching temperature, the less oriented the product.

It has now been found that it is possible to obtain a highly oriented, heat-shrinkable, multi-layer film comprising a layer comprising a polyamide and an outer heat-sealing layer comprising a polyolefin, which film has been oriented at a stretching ratio ≧ about 3.0:1 in the machine direction and at a stretching ratio ≧ about 6.0:1 in the transverse direction, when the polyamide is a crystalline or partially crystalline co-polyamide with a $T_g \leq 100°$ C.

The highly oriented heat-shrinkable multi-layer film, thus obtainable, is characterized by a combination of good mechanical properties, very good shrink properties, good gas barrier properties and good sealability.

DEFINITIONS

As used herein, the term "film" is used in a generic sense to include a plastic web, regardless of whether it is a film or a sheet. Preferably, films of use in the present invention have a thickness of 150 μm or less, more preferably of from about 8 to about 120 μm, and even more preferably of from about 10 to about 90 μm.

The term "oriented" designates a multi-layer structure which has been stretched at a temperature—indicated as the "orientation temperature"—higher than the $T_g$ of each of the resins making up the structure and lower than the m.p. of at least one of said resins, and set by cooling while substantially retaining its stretched dimensions. As used herein the term "oriented" designates bi-axially oriented materials, i.e. materials wherein the stretching is carried out in two perpendicular directions, i.e. the machine or longitudinal direction (MD) as well as the transverse direction (TD). An "oriented" material will tend to return to its original unstretched (unextended) dimensions when heated to a temperature close to the orientation temperature ("heat-shrinkable").

For the purposes of the present invention "heat-shrinkable" films are those films that shrink by at least 10% of their original dimensions, in each one of the machine and transverse directions, when heated to a temperature of 120° C. for 4 seconds. The quantitative determination of this "% Free Shrink" is carried out according to ASTM D2732, as set forth in the 1990 Annual Book of ASTM Standards, Vol. 08.02, pp. 368–371.

As used herein, the term "homo-polymer" is used with reference to a polymer resulting from the polymerization of a single monomer, i.e., a polymer consisting essentially of a single type of repeating unit.

As used herein, the term "co-polymer" refers to polymers formed by the polymerization reaction of at least two different monomers.

As used herein, the term "polymer" refers to both homo-polymers and co-polymers as defined above.

In particular the term "polyamide", as used herein, refers to both polyamide homo-polymers and polyamide co-polymers, also called co-polyamides.

As used herein the term "co-polyamide" on the other hand identifies the polyamide product built from at least two different starting materials, i.e. lactams, aminocarboxylic acids, equimolar amounts of diamines and dicarboxylic acids, in any proportion; this term therefore also encompasses ter-polyamides and, in general, multi-polyamides.

As used herein, the term "polyolefin" refers to any polymerized olefin, which can be linear, branched, cyclic, aromatic, substituted, or unsubstituted. More specifically, included in the term polyolefin are homo-polymers of olefin, co-polymers of olefin, co-polymers of an olefin and a non-olefinic comonomer copolymerizable with the olefin, such as vinyl monomers, modified polymers thereof, and the like. Specific examples include ethylene homo-polymers, ethylene-α-olefin copolymers, propylene homo-polymers, propylene-α-olefin copolymers, butene homo-polymers, butene-α-olefin copolymers, ethylene-vinyl acetate copolymers, ethylene-ethyl acrylate copolymers, ethylene-butyl acrylate copolymers, ethylene-methyl acrylate copolymers, ionomer resins, and modified polyolefins.

As used herein the term "ethylene homo-polymers", "propylene homo-polymers", or "butene homo-polymers" identify polymers consisting essentially of an ethylene, propylene or butene repeating unit respectively.

As used herein, the phrase "ethylene α-olefin co-polymer", and "ethylene/α-olefin co-polymer", refer to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT™ materials supplied by Exxon, AFFINITY™ and ENGAGE™ materials supplied by Dow, LUFLEXEN™ materials supplied by BASF and TAFMER™ materials supplied by Mitsui Petrochemical Corporation. These materials generally include co-polymers of ethylene with one or more co-monomers selected from $C_4$ to $C_{10}$ α-olefins such as butene-1 (i.e., 1-butene), hexene-1, octene-1, etc.

As used herein, the phrase "modified polymer", as well as more specific phrases such as "modified polyolefin", "modified ethylene vinyl acetate co-polymer", or "modified ethylene-α-olefin co-polymer" refer to such polymers having an acid or, preferably, an anhydride functionality, such as maleic or fumaric acid, or anhydride, grafted thereon and/or co-polymerized therewith and/or blended therewith. Preferably, such modified polymers have the anhydride functionality grafted on or polymerized therewith, as opposed to merely blended therewith.

As used herein, the phrase "directly adhered", as applied to film layers, is defined as adhesion of the subject film layer to the object film layer, without a tie layer, adhesive, or other layer there-between. As used herein "contiguous", when referred to two layers, is intended to refer to two layers that are directly adhered one to the other. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, i.e., one or more additional layers can be imposed between the subject layer and one or more of the layers the subject layer is between.

As used herein, the phrases "inner layer" and "internal layer" refer to any film layer having both of its principal surfaces directly adhered to another layer of the film.

As used herein, the phrase "outer layer" refers to any film layer having only one of its principal surfaces directly adhered to another layer of the film.

As used herein, the term "core", and the phrase "core layer" refer to any internal film layer that has a primary function other than serving as an adhesive or compatibilizer for adhering two layers to one another.

The term "barrier" as used herein means a layer of a multilayer film, which comprises a material which acts as a physical barrier to gaseous oxygen molecules. Typically the presence of the polyamide barrier layer within the film of the present invention will reduce the oxygen permeability of the film to less than 700 $cm^3/m^2$.day.bar, at 23° C. and 0% relative humidity. The oxygen permeability value is obtained in accordance with ASTM D3985-81.

Additional "barrier layers" may be present, such as layers comprising PVDC, ethylene-vinyl alcohol co-polymers, polyamides, blends of ethylene-vinyl alcohol co-polymers and polyamides, etc.

As used herein, the term "PVDC" refers to a vinylidene chloride co-polymer wherein a major amount of the co-polymer comprises vinylidene chloride and a minor amount of the co-polymer comprises one or more unsaturated monomers co-polymerisable therewith, typically vinyl chloride, and alkyl acrylates or methacrylates (e.g. methyl acrylate or methacrylate) or to a blend thereof in different proportions. Generally said PVDC contains plasticisers and/or stabilizers as known in the art.

As used herein, the phrase "bulk layer" refers to any layer that is present for the purpose of improving the abuse-resistance, toughness, modulus, etc., of the film. Bulk layers generally comprise polymers which are inexpensive relative to other polymers in the film which provide some specific purpose unrelated to abuse-resistance, modulus, etc.

As used herein, the phrase "tie layer" refers to any internal layer having the primary purpose of adhering two layers to one another.

As used herein the sentence "crystalline or at least partially crystalline co-polyamide" is used to distinguish the co-polyamide referred to from the amorphous ones, wherein the amorphous polyamides are characterized by no measurable melting point (and correspondingly by a heat of fusion less than 2.1 J/g), when measured by DSC according to ASTM 3417.

DETAILED DESCRIPTION OF THE INVENTION

A first object of the present invention is a multi-layer, thermoplastic film which has been oriented at a stretching ratio $\geq$ about 3.0:1 in the machine direction and at a stretching ratio $\geq$ about 6.0:1 in the transverse direction, which film comprises a layer a) comprising at least 50 wt. % of crystalline or partially crystalline co-polyamide characterized by a $T_g \leq 100°$ C., and at least one outer heat-sealing layer b) comprising a polyolefin, said film being further characterized in that it has a % free shrink in each direction of at least 10 at 120° C.

In a preferred embodiment of the present invention, the film is oriented at a stretching ratio $\geq$ about 3.5:1, more preferably $\geq$ about 4.0:1, and even more preferably $\geq$ about 4.5:1, in the machine direction and at a stretching ratio $\geq$ about 6.5:1, and more preferably $\geq$ about 7.0:1, in the transverse direction.

The at least 50 wt. % of crystalline or partially crystalline co-polyamide characterized by a $T_g \leq 100°$ C. of layer a) can be made up by a single crystalline or partially crystalline co-polyamide or by a blend of two or more crystalline or partially crystalline co-polyamides each one characterized by a $T_g \leq 100°$ C.

Examples of crystalline or partially crystalline co-polyamides characterized by a $T_g \leq 100°$ C. that can suitably be employed in layer a), are certain polyamide aliphatic co-polymers obtained by co-polymerization of ε-caprolactam and ω-laurolactam (polyamides 6/12 such as Grilon™ CF6S commercially available from EMS), certain aliphatic co-polymers obtained by co-polymerization of ε-caprolactam, hexamethylenediamine and azelaic acid (polyamides 6/69 such as Grilon™ CF62BS commercially available from EMS), polyamide co-polymers obtained from metaxylylendiamine, adipic acid and isophthalic acid (MDX6/MDXI such as Grilon™ FE 4581 commercially available from EMS), some multi-polyamides obtained from hexamethylenediamine, meta-xylylendiamine, adipic acid, and sebacic acid (such as Grilon™ XE3569 commercially available from EMS).

Preferably layer a) will comprise at least 60 wt. %, more preferably at least 70 wt. % and even more preferably at least 80 wt. %, of one or more crystalline or partially crystalline co-polyamides characterized by a $T_g \leq 100°$ C.

In one preferred embodiment layer a) will essentially consist of one or more crystalline or partially crystalline co-polyamides characterized by a $T_g \leq 100°$ C.

Alternatively the crystalline or partially crystalline co-polyamides of layer a) can be admixed with any other resin compatible therewith that would not impair the orientability of the structure, such as less than about 50 wt. %, preferably less than about 40 wt. %, and even more preferably less than about 30 wt. %, of crystalline or partially crystalline polyamides having a $T_g > 100°$ C., amorphous polyamides, ethylene-vinyl alcohol co-polymers, polyesters or co-polyesters, etc.

Preferably in such a case the crystalline or partially crystalline co-polyamides of layer a) will be admixed with one or more polymers selected from the group consisting of crystalline or partially crystalline polyamides having a $T_g > 100°$ C., amorphous polyamides, and ethylene-vinyl alcohol co-polymers.

More preferably in such a case the crystalline or partially crystalline co-polyamides of layer a) will be admixed with one or more polymers selected from the group consisting of crystalline or partially crystalline polyamides having a $T_g > 100°$ C., and ethylene-vinyl alcohol co-polymers.

The thickness of the co-polyamide comprising layer a) is typically of from about 1.5 to about 25 μm. Layers thinner than 1.5 μm would not provide the film with the desired mechanical and barrier properties, while layers thicker than 25 μm would increase the cost of the film unnecessarily as the advantages brought by a further increase in the wt. % amount of co-polyamide in the overall film would not be dramatic. Preferably the thickness of the co-polyamide comprising layer a) is of from about 2.5 to about 15 μm In the films according to the present invention the outer heat-sealing layer b) may comprise a single polymer or a blend of two or more polymers as known in the art. Preferably the melting point of the polyolefin resin(s) of the outer heat-sealing layer b) will be <150° C., and preferably <140° C. In a more preferred embodiment it will be comprised between about 80° C. and about 135° C. and in an even more preferred embodiment it will be comprised between about 90° C. and about 128° C.

Such a layer may for example comprise one or more heterogeneous or homogeneous ethylene-($C_4$–$C_8$)-α-olefin co-polymers having a density $\leq 0.925$ g/cm$^3$; blends thereof with minor amount of polyethylene homo-polymers or heterogeneous or homogeneous ethylene-($C_4$–$C_8$)-α-olefin co-polymers having a density >0.925 g/cm$^3$; ethylene-vinyl acetate co-polymers; ethylene-acrylic or methacrylic acid co-polymers including ionomers; blends of heterogeneous or homogeneous ethylene-($C_4$–$C_8$)-α-olefin co-polymers having a density from about 0.915 g/cm$^3$ to about 0.935 g/cm$^3$ with ethylene-vinyl acetate co-polymers or ethylene-alkyl (meth)acrylate co-polymers; ethylene-propylene-co-polymers; ethylene-propylene-butene ter-polymers; ethylene-alkyl acrylate-maleic anhydride ter-polymers; and the like polymers.

In a preferred embodiment of the present invention the heat-sealing layer b) will comprise a heterogeneous or homogeneous ethylene-($C_4$–$C_8$)-α-olefin co-polymer having a density $\leq 0.925$ g/cm$^3$, and even more preferably a heterogeneous or homogeneous ethylene-($C_4$–$C_8$)-α-olefin co-polymer having a density comprised between about 0.900 g/cm$^3$ and about 0.922 g/cm$^3$. The Melt Index of said heterogeneous or homogeneous ethylene-($C_4$–C8)-α-olefin co-polymer may range from about 0.1 to about 15 g/10 min (measured by ASTM D-1238, Condition E). However, preferred values are in the range 0.5–10 g/10 min and still more preferred values are in the range 1.0–7.0 g/10 min.

The thickness of the outer heat-sealing layer b) is generally higher than 2 μm, and preferably higher than 3 μm.

In certain cases, depending on the polyolefin used for the outer heat-sealing layer b), it may be necessary or advisable to position a tie layer c) between the layer comprising the co-polyamide and the outer heat-sealing polyolefin one, in order to get a sufficient bond between the film layers. Preferred resins for such a tie layer will be e.g. modified ethylene-α-olefin co-polymers or modified co-polymers of ethylene and an ethylenically unsaturated ester, typically modified ethylene-vinyl acetate co-polymers.

In a preferred embodiment of the present invention the co-polyamide layer a) is an internal layer and the film has an additional outer layer d).

Preferably said outer layer d) will comprise a polyolefin.

Preferably, but not necessarily, the composition of the outer layer d) will be the same of the outer heat-sealing layer b), so as to provide for a symmetrical structure.

The use of a symmetrical structure is highly preferred when thin films (from about 8 to about 20 μm) are desired to be employed in high-speed HFFS (Horizontal-Form-Fill-Seal) machines. A symmetrical structure does not give any curl and has therefore a good machinability. Furthermore, a symmetrical structure can also be lap-sealed if desired.

When the film of the present invention is employed in the manufacture of bags, e.g. by folding the flat film and transverse sealing it, a thicker structure (typically from about 40 to about 120 μm) will be preferred and the outer layer d) will be suitably selected, independently from the outer heat-sealing layer b), with the aim at providing the bag with a high abuse resistance. In such a case preferred resins for said outer layer d) would be heterogeneous or homogeneous ethylene-($C_4$–$C_8$)-α-olefin co-polymers having a density from about 0.915 g/cm$^3$ to about 0.935 g/cm$^3$ possibly blended with polyethylene homo-polymers, ethylene-vinyl acetate co-polymers or ethylene-alkyl (meth)acrylate co-polymers; and ethylene-propylene co-polymers.

Also between the co-polyamide layer a) and the outer layer d) it may be necessary or advisable to position a tie layer c'). Tie layer c') is defined as tie layer c) above, but it can be equal or different from c).

In a most preferred embodiment of the present invention, the film will therefore comprise at least 5 layers with tie layers c) and c') positioned between the internal co-polyamide layer a) and the outer layers b) and d) respectively.

Additional layers may be present in the overall structure to improve the characteristics thereof.

The thermoplastic resins which are employed in these optional, additional, layers need however to be highly orientable at temperatures compatible with the rest of the structure and with the mechanical and shrink properties desired for the end film.

Suitable resins are, for example, polyolefins, and in particular heterogeneous ethylene-α-olefin co-polymers, homogeneous ethylene-α-olefin co-polymers, ethylene-vinyl acetate co-polymers, ethylene-(meth)acrylic acid co-polymers, ethylene-alkyl(meth)acrylate co-polymers, ionomers, modified polyolefins, and blends thereof. These resins can be used for instance in internal layers to provide the required bulk.

PVDC also is a suitable resin that can be employed in a core layer when high barrier properties (oxygen permeability lower than 50 cm$^3$/m$^2$.day.bar, at 23° C. and 0% or 100% relative humidity) are required.

The resins used in the manufacture of the films according to the present invention can be suitably additivated as known in the art in order to improve the properties of the film or to ease the manufacture thereof.

As an example the resins may contain stabilizers, anti oxidants, pigments, UV absorbers, cross-linking enhancers or cross-linking inhibitors, anti-fog agents or compositions, slip and anti-blocking agents, etc., as conventionally used in this field.

In particular the outer layers may comprise slip and anti-blocking agents as conventionally used in this field such as silica, either natural or synthetic silica, calcium stearate, amides or bis-amides, etc.

The thickness ratio between the different layers in the final film is not critical and depends on the overall thickness desired for the end film, on the number of layers in the structure and on the OTR desired for the structure.

The film according to the present invention is conveniently manufactured by extrusion of a thick primary tape that is then stretched by a tenter frame.

The primary tape can be obtained by co-extrusion or by extrusion coating using any known extrusion technique and, if a round die is employed, by opening of the tubular tape to give the sheet to be flat stretched.

However, while hot blown as well as cast extrusion through a round die can be employed, preferably the primary tape is extruded through a flat die.

Preferably the tape is co-extruded but—as indicated above—the technique of extrusion coating for the preparation of said primary tape is however possible.

The flat multi-layer tape is extruded onto a cooled roll and quenched as known in the art. Then it is re-heated and stretched in the machine direction and in the transverse direction. Typically, orientation in the machine direction and that in the transverse direction are carried out separately, wherein, preferably, that in the machine direction is carried out first. Simultaneous stretching is however also possible.

To stretch in the machine direction, the tape is passed through at least two sets of heated rolls revolving at different speed, with the downstream set moving at a higher speed. The temperature at which stretching in the machine direction is carried out ranges from about 85° C. to about 110° C. The pre-heating temperature (i.e. the temperature of the heated rolls through which the tape is passed before the stretching step starts) and the relaxation temperature (i.e. the temperature of the heated rolls through which the tape is passed after the stretching step in machine direction is complete) are generally 10 to 20° C. higher.

The stretching ratio in the machine direction is at least 3.0:1 but higher stretching ratios, up to 5.0:1, 6.0:1 or 7.0:1, can be applied.

The stretching in the transverse direction is carried out by means of a tenter frame oven that comprises a certain number of heating zones and suitable stretching means.

The stretching temperature is typically comprised between about 120 and about 135° C., with a pre-heating temperature of 5 to 15° C. higher and a relaxation temperature of from about 80 to about 110° C.

The stretching ratio in the transverse direction is at least 6.0:1 but higher stretching ratios, e.g. up to 8.0:1, 9.0:1 or even more, can be applied.

If a more balanced shrink behavior of the end film is desired, the film may also be submitted to an additional orientation step, in the machine direction, following the transverse stretching. In such a case the stretching temperature of said additional, third, stretching step, would be lower than that employed for the transversal orientation and the stretching ratio would be limited, i.e. up to about 2.0:1.

In a preferred embodiment of the present invention the film is partially or wholly cross-linked. To produce cross-linking an extrudate is treated with a suitable radiation dosage of high-energy electrons, preferably using an electron accelerator, with the dosage level being determined by standard dosimetry methods. Other accelerators such as a Van der Graaf generator or resonating transformer may be used. The radiation is not limited to electrons from an accelerator since any ionizing radiation may be used. Radiation dosages are referred to herein in terms of kGreys. A suitable radiation dosage of high energy electrons is up to about 140 kGreys, typically in the range of from about 10 to about 120 kGreys, preferably it is in the range of from about 20 to about 100 and even more preferably in the range of from about 30 to about 80 kGreys.

Irradiation is most preferably performed prior to orientation but it could also be performed after orientation.

The film of the present invention may be used either as a film or as a bag to form a package in a conventional manner.

The film may also be printed. In the simplest cases just black letters with the product identification and the instructions for correct product storage or use, or in the most complex cases designs made with various colors, advertising the product and the producer. To improve print adhesion, the film of the present invention may be primed using a coating of a resin that improves adhesion, gloss or durability of the following print, or alternatively the surface of the film which will be printed, can be rendered more receptive to ink by subjecting it to a corona discharge treatment or to any other treatment that is known to increase surface energy, such as flame treatment.

The invention will now be described with reference to the following examples which are intended to be illustrative of some preferred embodiments of thermoplastic films.

Said examples should not be interpreted as a limitation to the scope of the present invention.

Melt Flow Indexes (MFI's) are measured by ASTM D-1238, Condition E, 190° C./2.16 kg, and are reported in grams/10 minutes.

The densities have been measured by ASTM D 792.

Unless otherwise specifically indicated, all percentages are by weight.

Melting points, if not otherwise indicated, have been determined by DSC following ASTM D-3418 ($2^{nd}$ heating—10° C./min).

Glass transition points have also been determined by DSC following ASTM D-3418.

OTR is evaluated, at 23° C. and 0% R.H., according to ASTM D-3985 using an OX-TRAN instrument by Mocon.

EXAMPLE 1

A 5-layer film having the following structure:

A/B/C/B/A, wherein

A is a blend of 50% of linear low density polyethylene with d=0.920 g/cm$^3$, and MFI=1 g/10 min (Dowlex™ 2045 E commercially available from Dow), 25% of ethylene-vinyl acetate co-polymer with 4.5% VA, MFI=2.0 g/10 min (Escorene™ LD362BW commercially available from Exxon), and 25% of linear medium density polyethylene with d=0.935 g/cm$^3$, and MFI=2.6 g/10 min (Dowlex™ SC 2102.00 commercially available from Dow), comprising about 0.1% of silica and about 0.3% of erucamide;

B is an anhydride grafted polyolefin in butene based linear low density polyethylene (Bynel™ 4104 commercially available from DuPont); and C is a multi-polyamide obtained from the following monomers: hexamethylenediamine, meta-xylylenediamine, adipic acid and sebacic acid characterized by a glass transition point of 57° C. and a melting point of 181° C. (Grilon™ XE3569 commercially available from EMS), and the layer ratio is 5/3/4/3/5, is prepared by co-extrusion through a flat die at a die temperature of about 230° C. The tape, 525 μm thick and 575 mm wide, is cooled by means of a chill roll kept at 20° C. The linear speed of the quenched tape is 20 m/min. The tape is then cross-linked to 60 kGreys and then pre-heated to a temperature of about 110° C. on oil heated rolls and stretched in machine direction at a temperature of about 90° C. with a stretching ratio of about 4.0:1. The MD oriented tape is passed through another set of rolls heated to a temperature of about 110° C. for relaxation, and then transferred to a tenter frame oven having four heating zones in which the temperature (pre-heating temperature) is about 135° C. Stretching, to a TD stretching ratio of about 6.5: 1, is then carried out at a temperature of about 125° C., and finally relaxation is carried out at a temperature of from about 93° C. to about 85° C.

Finally the film is cooled and wound onto a roll. The obtained biaxially oriented film has a final thickness of about 20 μm.

The film has a % free shrink in MD of 27 and a % free shrink in TD of 45 at 120° C.

EXAMPLE 2

A 5-layer film having the following structure:

A/B/C'/B/A, wherein A and B are as in Example 1 and C' is an MXD6/MDXI co-polyamide characterized by a glass transition point of 96° C. and a melting point of 213° C. (Grilon™ FE4581 commercially available from EMS), is prepared by following essentially the same procedure as in the foregoing example.

The film has a % free shrink in MD of 15 and a % free shrink in TD of 56 at 120° C.

The film also shows an OTR of 86 cm$^3$/m$^2$.day.bar, at 23° C. and 0% relative humidity and of 120 cm$^3$/m$^2$.day.bar, at 23° C. and 100% relative humidity.

EXAMPLE 3

A 5-layer film having the following structure:

A/B/C"/B/A, wherein A and B are as in Example 1 and C" is a blend of 60 wt. % of a co-polyamide 6/12 characterized by a glass transition point of 25° C. and a melting point of 130° C. (Grilon™ CF6S commercially available from EMS), and 40 wt. % of ethylene-vinyl alcohol co-polymer with 44% by mole of ethylene (EVAL EP-E151B commercially available from Kuraray), is prepared by following essentially the same procedure as in example 1.

The film has a % free shrink in MD of 35 and a % free shrink in TD of 55 at 120° C.

The film also shows an otr of 68 cm$^3$/m$^2$.day.bar, at 23° C. and 0% relative humidity and of 233 cm$^3$/m$^2$.day.bar, at 23° C. and 100% relative humidity.

What is claimed is:

1. A multi-layer, heat shrinkable thermoplastic film comprising:

a) a core layer comprising at least 50%, by weight of the core layer, of a crystalline or partially crystalline copolyamide having a glass transition temperature of less than or equal to 100° C., wherein the crystalline or partially crystalline copolyamide is selected from the group consisting of
  i) an aliphatic copolymer obtained by the copolymerization of ε-caprolactam and ω-laurolactam,
  ii) an aliphatic copolymer obtained by the copolymerization of ε-caprolactam, hexamethylenediamine and azelaic acid,
  iii) a polyamide copolymer obtained from meta-xylylenediamine, adipic acid and isophthalic acid, and iv) a polyamide copolymer obtained from hexamethylenediamine, meta-xylylenediamine, adipic acid, and sebacic acid; and b) an outer layer comprising a polyolefin, wherein the film has a free shrink at 120° C. of at least 10% in each of the machine and transverse directions.

2. The film of claim 1 wherein the core layer comprises a blend of the crystalline or partially crystalline copolyamide having a glass transition temperature of less than or equal to 100° C., and at least one polymer selected from the group consisting of i) a crystalline or partially crystalline polyamide having a glass transition temperature greater than 100° C.,
ii) amorphous polyamide, and
iii) ethylene/vinyl alcohol copolymer.

3. The film of claim 1 wherein the polyolefin of the outer layer has a melting point less than 150° C.

4. The film of claim 1 wherein the polyolefin of the outer layer comprises a polymer selected from the group consisting of a) a heterogeneous or homogeneous ethylene/($C_4$–$C_8$)-alpha-olefin copolymer having a density less than or equal to 0.925 g/cm$^3$;
b) a blend of a major amount of a heterogeneous or homogeneous ethylene/($C_4$–$C_8$)-alpha-olefin copolymer having a density less than or equal to 0.925 g/cm$^3$, and a minor amount of a second polymer selected from the group consisting of
  (i) a polyethylene homopolymer,
  (ii) a heterogeneous or homogeneous ethylene/($C_4$–$C_8$)-alpha-olefin copolymer having a density greater than 0.925 g/cm$^3$,
  iii) ethylene/vinyl acetate copolymer,
  iv) ethylene/(meth)acrylic acid copolymer,
  v) ionomer,
  vi) a blend of a heterogeneous or homogeneous ethylene/($C_4$–$C_8$)-alpha-olefin copolymer having a density of between 0.915 g/cm$^3$ and 0.935 g/cm$^3$, and ethylene/vinyl acetate copolymer or ethylene-alkyl (meth)acrylate copolymer,
  vii) ethylene/propylene copolymer,
  viii) ethylene/propylene/butene terpolymer, and
  ix) ethylene/alkyl acrylate/maleic anhydride terpolymer.

5. The film of claim 1 comprising a second outer layer, disposed on an opposite side of the core layer from the outer layer of claim 1, comprising a polyolefin.

6. A multi-layer, heat shrinkable thermoplastic film comprising:

a) a core layer comprising at least 50%, by weight of the core layer, of a crystalline or partially crystalline copolyamide having a glass transition temperature of less than or equal to 100° C., wherein the crystalline or partially crystalline copolyamide is selected from the group consisting of
  i) an aliphatic copolymer obtained by the copolymerization of ε-caprolactam and ω-laurolactam,
  ii) an aliphatic copolymers obtained by the copolymerization of ε-caprolactam, hexamethylenediamine and azelaic acid,
  iii) a polyamide copolymer obtained from meta-xylylenediamine, adipic acid and isophthalic acid, and
  iv) a polyamide copolymer obtained from hexamethylenediamine, meta-xylylenediamine, adipic acid, and sebacic acid;

b) a first and second internal layer, each disposed on an opposite side of the core layer, each comprising a material selected from
  i) a modified ethylene/alpha olefin copolymer, and
  ii) a modified copolymer of ethylene and an ethylenically unsaturated ester; and
c) a first and second outer layer, disposed on the first and second internal layer respectively, comprising a polyolefin;

wherein the film has a free shrink at 120° C. of at least 10% in each of the machine and transverse directions.

7. The film of claim 6 wherein the polyolefin of the outer layer comprises a polymer selected from the group consisting of a) a heterogeneous or homogeneous ethylene-($C_4$–$C_8$)-α-olefin copolymers having a density less than or equal to 0.925 g/cm$^3$,
b) a blend of a major amount of a heterogeneous or homogeneous ethylene/($C_4$–$C_8$)-alpha-olefin copolymer having a density less than or equal to 0.925 g/cm$^3$, and a minor amount of a second polymer selected from the group consisting of
  (i) a polyethylene homopolymer,
  (ii) a heterogeneous or homogeneous ethylene-($C_4$–$C_8$)-α-olefin copolymer having a density greater than 0.925 g/cm$^3$,
  iii) ethylene/vinyl acetate copolymer,
  iv) ethylene/(meth)acrylic acid copolymer,
  v) ionomer,
  vi) a blend of a heterogeneous or homogeneous ethylene-($C_4$–$C_8$)-alpha-olefin copolymer having a density of between 0.915 g/cm$^3$ and 0.935 g/cm$^3$, and ethylene/vinyl acetate copolymer or ethylene-alkyl (meth)acrylate copolymer,
  vii) ethylene/propylene copolymer,
  viii) ethylene/propylene/butene terpolymer, and
  ix) ethylene/alkyl acrylate/maleic anhydride terpolymer.

8. A method of making a multi-layer, heat shrinkable thermoplastic film comprising:

a) extruding a tape through a flat die, the tape comprising
  i) a core layer comprising at least 50%, by weight of the core layer, of a crystalline or partially crystalline copolyamide having a glass transition temperature of less than or equal to 100° C., and
  ii) an outer layer comprising a polyolefin;
b) quenching the extruded tape;
c) reheating the quenched tape; and
d) stretching the reheated tape in a tenter frame
  i) in the machine direction at a temperature between 85° C. and 110° C. at a stretching ratio of at least 3.0:1, and
  ii) in the transverse direction at a temperature between 120° C. and 135° C. at a stretching ratio of at least 6.0:1.

9. The method of claim 8 wherein the reheated tape is stretched simultaneously in the machine and transverse direction.

10. The method of claim 8 wherein the reheated tape is stretched sequentially in the machine and transverse direction.

11. The method of claim 8 comprising coextruding the tape through a flat die.

12. The method of claim 8 comprising extruding the tape through a flat die by an extrusion coating process.

13. The method of claim 8 comprising crosslinking the extruded tape.

14. The method of claim 13 comprising crosslinking the extruded tape before stretching the reheated tape.

15. The method of claim 13 comprising crosslinking the extruded tape after stretching the reheated tape.

16. The method of claim 8 comprising crosslinking the extruded tape by ionizing irradiation.

17. The method of claim 16 comprising crosslinking the extruded tape by ionizing irradiation in the form of high-energy electrons at a dosage of between 10 and 120 kiloGrays.

18. The method of claim 8 comprising
 a) coextruding a tape through a flat die, the tape comprising
  i) a core layer comprising at least 50%, by weight of the core layer, of a crystalline or partially crystalline copolyamide having a glass transition temperature of less than or equal to 100° C., wherein the crystalline or partially crystalline copolyamide is selected from the group consisting of
   (a) an aliphatic copolymer obtained by the copolymerization of ε-caprolactam and ω-laurolactam,
   (b) an aliphatic copolymers obtained by the copolymerization of ε-caprolactam, hexamethylenediamine and azelaic acid,
   (c) a polyamide copolymer obtained from meta-xylylenediamine, adipic acid and isophthalic acid, and
   (d) a polyamide copolymer obtained from hexamethylenediamine, meta-xylylenediamine, adipic acid, and sebacic acid;
  ii) a first and second internal layer, each disposed on an opposite side of the core layer, each comprising a material selected from
   (a) a modified ethylene/alpha olefin copolymer, and
   (b) a modified copolymer of ethylene and an ethylenically unsaturated ester; and
  iii) a first and second outer layer, disposed on the first and second internal layer respectively, comprising a polyolefin, wherein the film has a free shrink at 120° C. of at least 10% in each of the machine and transverse directions;
 b) quenching the extruded tape;
 reheating the quenched tape; and
 d) stretching the reheated tape in a tenter frame
  i) in the machine direction at a temperature between 85° C. and 110° C. at a stretching ratio of at least 3.0:1, and
  ii) in the transverse direction at a temperature between 120° C. and 135° C. at a stretching ratio of at least 6.0:1.

* * * * *